(12) United States Patent
Burritt

(10) Patent No.: US 6,292,550 B1
(45) Date of Patent: Sep. 18, 2001

(54) DYNAMIC CALL VECTORING

(75) Inventor: David R. Burritt, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/088,532

(22) Filed: Jun. 1, 1998

(51) Int. Cl.$^7$ ............................. H04M 3/00; H04M 3/42
(52) U.S. Cl. ........................ 379/201; 379/242; 379/265
(58) Field of Search .................................. 379/219, 201, 379/265, 266, 207, 242

(56) References Cited

U.S. PATENT DOCUMENTS

| | | | |
|---|---|---|---|
| 5,870,464 | * 2/1999 | Brewster et al. | 379/219 |
| 5,903,641 | * 5/1999 | Tonisson | 379/266 |
| 5,987,116 | * 11/1999 | Petrunka | 379/265 |
| 5,987,118 | * 11/1999 | Dickerman et al. | 379/265 |
| 6,083,280 | * 7/2000 | Eitel | 717/4 |
| 6,088,441 | * 7/2000 | Flockhart et al. | 379/265 |

FOREIGN PATENT DOCUMENTS 0 748 102 A2   12/1996   (EP) ............................... H04M/3/50

OTHER PUBLICATIONS

Hassler, K.W. et al: *Revolutionizing Definity Call Centers In The 1990s*, AT&T Technical Journal, US, American Telephone and Telegraph Co., New York, vol. 74, No. 4, Jul. 1, 1995.
*DEFINITY$^R$ Communications System Generic 3; Call Vectoring/Expert Agent Selection (EAS) Guide*, 555–230–520, Issue 3, Nov. 1993, and Issue 2, Jul. 1993, 1–1–3–15 and 4–1–4–23 and 7–1–7–9.

AT&T DEFINITY Communications System Generic 3—Call Vectoring EAS Guide 555–230–520 Issue 3, Nov. 1993 pp. 3–9 to 3–12.*

* cited by examiner

Primary Examiner—Harry S. Hong
(74) Attorney, Agent, or Firm—David Volejnicek

(57) ABSTRACT

A telecommunications switching system such as a private branch exchange (100) processes calls as follows. When it receives (200) a call associated with an individual vector directory number (VDN), the switching system invokes conventional vectoring (107) and commences processing the call by executing (202) the VDN's call-processing vector. However, when it encounters (206) a "wait" vector command in the executing vector, the switching system sends (208) a notice of the call and the call's identity to an external source of vectors, such as an expert system implemented on an adjunct processor (110). This notice functions as a request for another call-processing vector for the call. The expert system obtains (252–256) information relevant to processing of the call from the switching system and from external databases (111–112), and based on that information dynamically creates (258) a new call-processing vector for the call, in real time. When the switching system receives (220) this new vector, it replaces (222) the old vector with the new vector and continues processing of the call by restarting (224) vector processing and executing (202) the new vector. The switching system may obtain yet additional vectors for processing this call in the same manner as it obtained the second vector. The switching system may also obtain a new vector from the external source for each newly-received call.

17 Claims, 3 Drawing Sheets

300 { WAIT 10 SECONDS
      DISCONNECT/DROP

301 { PLAY ANNOUNCEMENT #5
      COLLECT 2 DIGITS
      WAIT 10 SECONDS

302 { ROUTE TO SPLIT 15 PRIORITY MEDIUM

*FIG. 3*

DYNAMIC CALL VECTORING

TECHNICAL FIELD

This invention relates to call processing.

BACKGROUND OF THE INVENTION

Call vectoring is a feature that provides telephone switching system users with a highly-flexible approach to managing incoming call traffic. By using a series (called a vector) of user-defined commands (called vector commands), internal and network calls can be directed or routed as desired, thereby determining how these calls are processed. Call vectoring is flexible in that it permits unique treatment for each call according to a number of factors. Call vectoring is illustratively described in *DEFINITY® Communications System Generic 3 Call Vectoring/Expert Agent Selection (EAS) Guide,* AT&T Pub. No. 555-230-520, Issue 3, Nov. 1993.

The existing call vectoring capability is very powerful. However, all vectors must be defined ahead of time (pre-administered), and there is a limit on the number of vectors that can be administered. Moreover, these vectors are static: they cannot be changed or customized on a call-by-call basis. But more and more users, especially in complex call centers, want to do more and more exotic things with their vectors, and want to make real-time decisions on how to route calls.

The Lucent Technologies DEFINITY communications switching system has a vector command called "adjunct routing". This command is also described in the document identified above, in Chapter 7. This command allows the switching system to request a call route from a third-party application, e.g., an adjunct processor, and route the call according to the received call route. However, this command is limited in that it allows only a single call route, and not a vector, to be obtained by the switching system. Hence, this command does not provide sufficient functionality and flexibility to satisfy customer demands.

SUMMARY OF THE INVENTION

This invention is directed to solving these and other problems and disadvantages of the prior art. Exemplarily according to the invention, a switching system is able to obtain a call-processing vector comprising a plurality of vector commands from an external source, e.g., an adjunct processor, and preferably is able to obtain call-processing vectors on a call-by-call basis. This allows a third-party application or another source external to the switching system to dynamically reprogram call-processing vectors and to associate different vectors with different calls. Hence, call processing can be customized on a real-time and call-by-call basis. This solution requires minimal changes to switching systems and their vectoring engines, but gives customers the great deal of flexibility that they have sought in handling calls.

Generally according to the invention, a telecommunications switching system processes a call by first requesting a call-processing vector from a source that is external to the switching system (e.g., an expert system implemented on an adjunct processor), and in response to receipt of the call-processing vector processes the call by executing the received call-processing vector. A call-processing vector is a program that has a plurality of instructions (vector commands), executable by the switching system. Illustratively, the request takes the form of a notification of the call and its identity to the external source. Preferably, the switching system may request a plurality of call-processing vectors for the same call, and may request a different call-processing vector on a call-by-call basis. Typically, the switching system makes the request for a call-processing vector in response to having received a call for processing. A request for another vector for the same call is triggered by execution of a particular command (e.g., a "wait" command) in the vector that is presently being executed.

According to an illustrative embodiment of the invention, a telecommunications switching system processes a call in the following manner. In response to receiving for processing a call associated with an individual vector directory number (VDN), the switching system processes the call by executing a first call-processing vector possessed by the switching system and corresponding to the individual VDN, as is conventional. But, as a part of executing the first call-processing vector, the switching system requests—illustratively in response to encountering a particular vector command in the first vector—a second call-processing vector from a source external to the switching system. When it receives the second call-processing vector, which comprises a plurality of vector commands, from the external source, the switching system continues processing of the call by executing the second call-processing vector instead of continuing execution of the first call-processing vector. In a similar manner to how it obtained the second vector, the switching system may obtain additional vectors for processing the subject call. In response to the request and before providing the second vector, the external source may request from the switching system information relating to the call, and the switching system fulfills that request.

The invention includes both a method of call processing as well as a call-processing switching apparatus and a computer readable medium that contains software which, when executed in a switching system, causes the switching system to perform the call-processing method. The apparatus preferably includes an effector—any entity that effects the corresponding step, unlike a means—for each method step.

These and other features and advantages of the invention will become more apparent from the following description of an illustrative embodiment of the invention taken together with the drawing.

BRIEF DESCRIPTION OF THE DRAWING

FIG. 3 is an illustrative example of a series of vectors dynamically generated by the vectoring process of FIG. 2.

DETAILED DESCRIPTION

Figure 1:
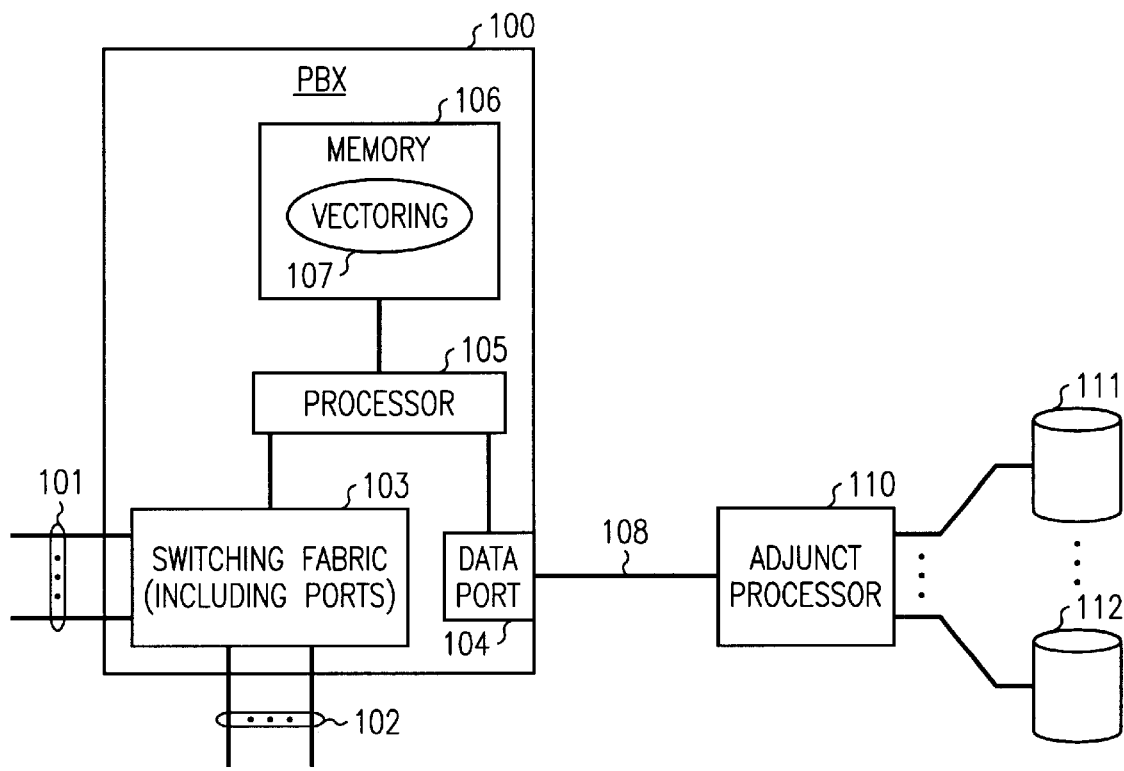
FIG. 1 is a block diagram of a communications system that includes an illustrative embodiment of the invention.

FIG. 1 shows a block diagram of a telecommunications system that includes an illustrative embodiment of the invention. It includes a telecommunications switching system, such as a private branch exchange (PBX) 100, connected to telecommunications trunks 101 and lines 102 and further connected by a data communications link 108 to an adjunct processor 110 which has access to various sources of data such as databases 111–112. PBX 100 is a stored-program-controlled machine, comprising a switching fabric (including trunk and line ports) 103 operating under control of a processor 105 that executes control programs stored in a memory 106. Included among the control programs in memory 106 and executed by processor 105 is a vectoring program 107. Illustratively, PBX 100 is the Definity® enterprise communications server of Lucent Technologies Inc. Trunks 101 are illustratively connected to other PBXs and to central switching systems of the public telephone network. Lines 102 are illustratively connected to end-user terminals such as telephones. Switching fabric 103 provides communications connections among lines 102 and between lines 102 and trunks 101.

PBX 100 further includes a data port 104 which interfaces processor 105 to one end of data communications link 108. Connected to the other end of link 108 is adjunct processor 110, which can be a personal computer, a workstation, or any other intelligent machine. Processor 105 and adjunct processor 110 communicate with each other over link 108 via any desired communications protocol. In this illustrative embodiment, communications over link 108 are carried on via a conventional transmission control protocol/internet protocol (TCP/IP) sockets mechanism.

According to the invention, adjunct processor 110 is an expert system programmed to create call-processing vectors for PBX 100 by using data provided by PBX 100 and databases 111–112, as would an administrator of PBX 100 when administering PBX 100. The differences between adjunct processor 110 and a PBX administrator are that (a) processor 110 creates vectors automatically without human involvement, (b) processor 110 creates vectors externally to PBX 100, and (c) processor 110 creates vectors on-the-fly, dynamically, on a per-call and real-time basis. Further according to the invention, conventional vectoring of PBX 100 is modified to request call-processing vectors from processor 110 and to execute processor 110-supplied vectors on a per-call basis. This is illustrated in FIG. 2.

Figure 2:
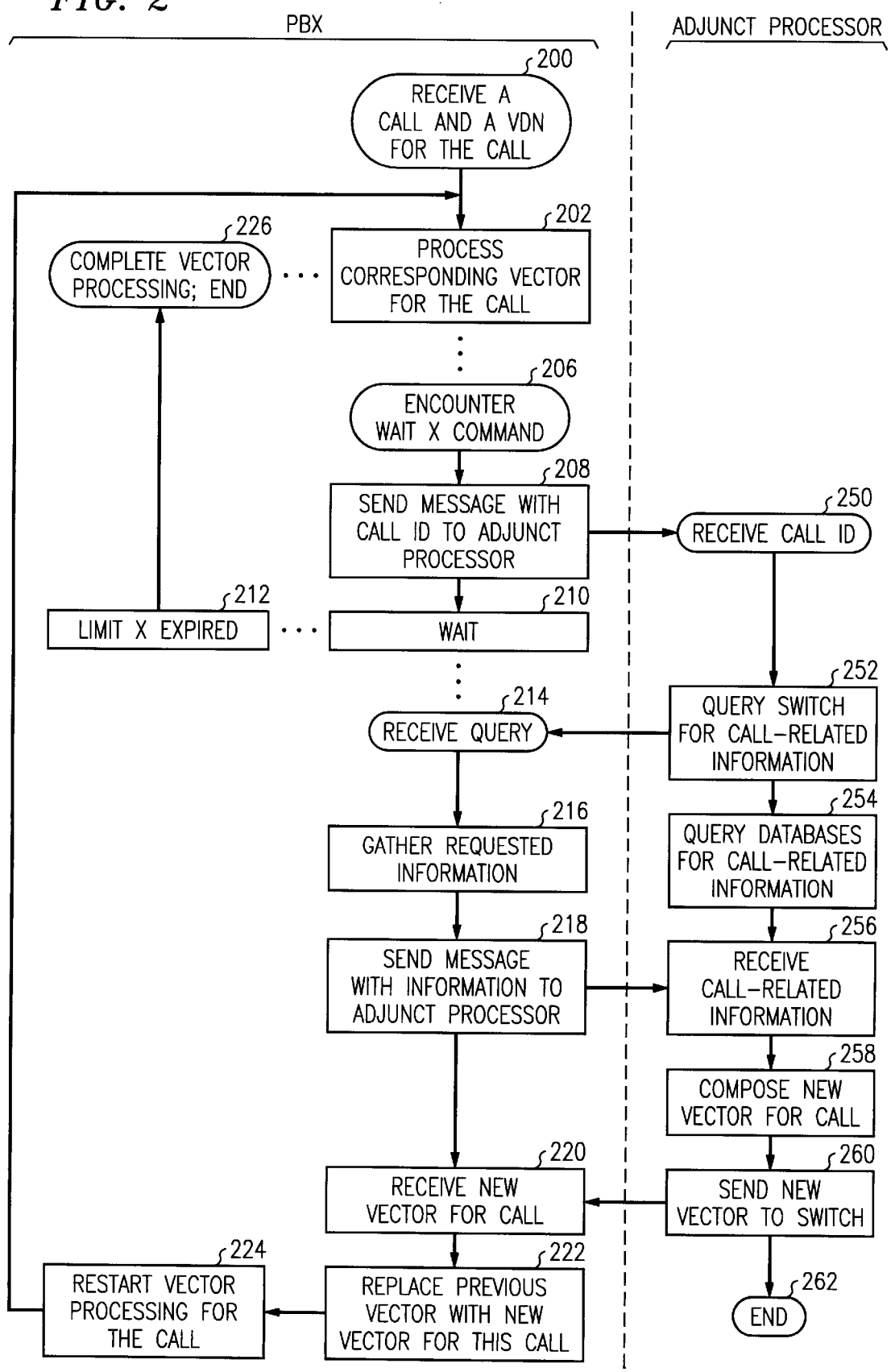
FIG. 2 is a functional flow diagram of a vectoring process of the system of FIG. 1.

As shown in FIG. 2, vector processing for a call commences when PBX 100 receives a call and associates a vector directory number (VDN) with that call, at step 200, in a conventional manner. In response, processor 105 conventionally retrieves a pre-administered call-processing vector, possessed by PBX 100, that corresponds to the call's VDN. The vector is a program consisting of instructions executable by processor 105. Processor 105 processes (executes) the vector, at step 202. Conventionally, processor 105 would process the vector to completion, thereby providing the call with whatever services and/or connections are specified by the vector, and then end vectoring for that call, at step 226. According to the invention, however, if, during the executing of the vector, processor 105 encounters a predetermined command, e.g., a "wait" vector command, at step 206, it stops executing the vector and sends a message bearing the call ID of the subject call to adjunct processor 110 over link 108, at step 208. This message acts as a request to adjunct processor 110 for a new call-processing vector for this call. Processor 105 then waits for a response from adjunct processor 110, at step 210.

The use of the "wait" vector command is a safety feature. The command specifies, in seconds, the period of time that processor 105 should wait at step 210 for a response from adjunct processor 1 10. If no response is received from adjunct processor 110 before the time period expires, at step 212, processor 105 continues with processing of the vector in which the "wait" vector command was encountered and processes it to completion, at step 226, in a conventional manner. This allows PBX 100 to engage in conventional vectoring if adjunct processor 110 should fail or otherwise become unavailable.

When adjunct processor 110 receives the message carrying the call ID from PBX 110, at step 250, it typically sends a query to PBX 100 requesting information possessed by PBX 100 that relates to how this call should be routed or processed, at step 252. Adjunct processor 110 also queries databases 111–112 for any information relevant to how the call should be treated and/or routed, at step 254.

If and when processor 105 receives the query from adjunct processor 110, at step 214, while processor 105 is in the wait state at step 210, it gathers the requested information on PBX 100, at step 216, and sends the gathered information in a message to adjunct processor 110, at step 218. Adjunct processor 110 receives the requested information, at step 256, and uses it with the information that it gathered from databases 111–112 at step 254 to compose a new call-processing vector for the call, at step 258, which it then sends to PBX 100, at step 260.

When processor 105 receives the new vector, at step 220, it uses it as a replacement for the previous vector for this call (the vector that it started processing at step 202), at step 222. Processor 105 then restarts vector processing for this call, at step 224, and returns to step 202 to process the new vector for this call instead of continuing with processing of the previous vector.

During the processing of the new vector, processor 105 may again encounter a "wait" command, at step 206, which results in adjunct processor 110 again being notified, at step 250, and possibly PBX 100 again being supplied with yet another new vector for the call. This loop may repeat—indefinitely, in theory—until one of the vectors for the call is processed to completion and vectoring for the call ends, at step 226.

FIG. 3 shows an illustrative example of the dynamic call vectoring according to this invention. When an incoming call corresponding to a VDN associated with vector 300 is received by PBX 100, vector 300 is executed for the call. The vector illustratively comprises two commands: wait 10 seconds, and disconnect/drop. As mentioned above, the "wait" command causes PBX 100 to notify adjunct processor 110 of the call. The "disconnect/drop" command is there as a safety feature, in case adjunct processor 110 does not respond within 10 seconds.

After obtaining information relevant to the call from PBX 100 and databases 111–112, adjunct processor 110 applies its expertise to this information and formulates a new vector 301 for the call. Vector 301 illustratively tells PBX 100 to play a particular announcement to the caller, collect two dialed digits from the caller as the caller's response to the announcement, and then wait 10 seconds. Adjunct processor 110 sends vector 301 to PBX 100, and PBX 100 substitutes vector 301 for vector 300 and restarts vector processing for the call. When PBX 100 encounters the "wait" command of vector 301, it again sends a message to adjunct processor 110. In response, adjunct processor 110 retrieves the two collected digits from PBX 100, analyzes them, and in response formulates a new vector 302 for the call, which it sends to PBX 100. PBX 100 substitutes vector 302 for vector 301 and restarts vector processing for the call. Vector 302 tells PBX 100 to route the call to a particular ACD split with a particular priority, and PBX 100 does so. Processing of vector 302 thus comes to an end, and therefore so does vectoring for this call.

Of course, various changes and modifications to the illustrative embodiment described above may be envisioned. For example, after the call is queued to a split, the adjunct processor may continue to analyze the call. Illustratively, the adjunct processor may have determined that this is a VIP customer and sent a notification about the call to a supervisor (who normally does not take calls). The supervisor could tell the adjunct processor to route the call to him/her. The adjunct processor could then formulate yet another vector, send it to the PBX and instruct the PBX to remove the call from all the splits, and restart vector processing with the new vector. Such changes and modifications can be made without departing from the spirit and the scope of the invention and without diminishing its attendant advantages. It is therefore intended that such changes and modifications be covered by the following claims.

What is claimed is:

1. A method of processing a call in a telecommunications switching system, comprising the steps of:
   in response to receiving a call for processing, the switching system processing the call by executing a first call-processing vector possessed by the switching system;
   as a part of executing the first call-processing vector, the switching system requesting a call-processing vector for the call from a source external to the switching system;
   in response to the request, the source selectively creating in real-time a second call-processing vector for processing only said call exclusive of other calls and sending the second calls-processing vector to the switching system;
   in response to receiving the second call-processing vector, comprising a plurality of vector commands, from the external source, the switching system processing the call by executing the received second call-processing vector instead of the first call-processing vector; and
   in response to not receiving the second call-processing vector, the switching system processing the call by continuing to execute the first call-processing vector.

2. The method of claim 1 wherein:
   each call-processing vector comprises a program having a plurality of instructions, executable by the switching system.

3. The method of claim 1 wherein:
   the step of processing by executing the received second call-processing vector comprises the steps of
   as a part of executing the received second call-processing vector, the switching system secondly requesting another call-processing vector for the call from the external source;
   in response to the second request, the source creating in real-time a third call-processing vector for processing only said call exclusive of other calls and sending the third call-processing vector to the switching system; and
   in response to receiving the third call-processing vector from the external source, the switching system continuing processing of the call by executing the received third call-processing vector.

4. The method of claim 3 further comprising the steps of:
   in response to receiving a second call for processing, the switching system processing the second call by executing the first call-processing vector possessed by the switching system;
   as a part of executing the first call-processing vector, the switching system requesting another call-processing vector from the external source;
   in response to the request, the source selectively creating in real-time a fourth call-processing vector for processing only said second call exclusive of other calls and sending the fourth call-processing vector to the switching system;
   in response to receiving the fourth call-processing vector, the switching system processing the second call by executing the received fourth call-processing vector instead of the first call-processing vector; and
   in response to not receiving the fourth call-processing vector, the switching system processing the second call by continuing to execute the first call-processing vector.

5. The method of claim 1 further comprising the steps of:
   in response to receiving a second call for processing, the switching system processing the second call by executing the first call-processing vector possessed by the switching system;
   as a part of executing the first call-processing vector, the switching system requesting another call-processing vector from the external source;
   in response to the request, the source creating in real-time a fourth call-processing vector for processing only said second call exclusively of other calls and sending the fourth call-processing vector to the switching system; and
   in response to receiving the fourth call-processing vector, the switching system processing the second call by executing the received fourth call-processing vector instead of the first call-processing vector.

6. A method of processing a call in a telecommunications switching system, comprising the steps of:
   in response to receiving for processing a call associated with an individual vector directory number (VDN), processing the call by executing a first call-processing vector possessed by the switching system and corresponding to the individual VDN;
   as a part of executing the first call-processing vector, the switching system requesting another call-processing vector from a source external to the switching system;
   in response to the request, the source selectively creating in real-time a second call processing vector for processing only said call exclusive of other calls and sending the second call-processing vector to the switching system;
   in response to receiving the second call-processing vector, comprising a plurality of vector commands, from the external source, the switching system continuing processing of the call by executing the second call-processing vector instead of continuing execution of the first call-processing vector; and
   in response to not receiving the second call-processing vector, the switching system continuing processing of the call by continuing to execute the first call-processing vector.

7. The method of claim 6 further comprising the steps of:
   as a part of executing the second call-processing vector, the switching system secondly requesting another call-processing vector from the external source;
   in response to the second request, the source creating in real-time a third call-processing vector for processing only said call exclusive of other calls and sending the third call-processing vector to the switching system; and
   in response to receiving the third call-processing vector from the external source, the switching system continuing processing of the call by executing the third call-processing vector instead of continuing execution of the second call-processing vector.

8. The method of claim 6 wherein:

the step of requesting comprises the steps of encountering a predetermined command in the first call-processing vector during execution of the first call-processing vector; and in response requesting the other call-processing vector from the external source.

9. The method of claim 8 wherein:

the predetermined command is a "wait" command.

10. The method of claim 6 wherein:

the step of requesting comprises the step of:

notifying the external source of an identity of the call.

11. The method of claim 6 further comprising the steps of:

in response to requesting the other call-processing vector, the switching system first receiving a request from the external source for information relating to the call; and in response to receiving the request from the external source, the switching system providing the requested information to the external source; wherein the external source creates the second call-processing vector in response to the provided information.

12. An apparatus that performs the method of claim 1 or 2 or 3 or 4 or 5 or 6 or 7 or 8 or 9 or 10 or 11.

13. A computer-readable medium containing software which, when executed in a stored-program-controller switching system, causes the switching system to perform the method of claim 1 or 2 or 3 or 4 or 5 or 6 or 7 or 8 or 9 or 10 or 11.

14. A telecommunications switching system comprising:

an effector of processing a received call by executing a first call-processing vector possessed by the switching system, in response to receiving the call;

an effector of requesting a call-processing vector from a source that is external to the switching system, as a part of executing the first call-processing vector; and an effector responsive to receiving from external source a second call-processing vector created in real-time by the external source in response to the request and for processing only said call exclusive of other calls and comprising a plurality of vector commands, of continuing processing of the call by executing the received second call-processing vector, and responsive to not receiving from the external source the second call-processing vector, of continuing processing of the call by continuing to execute the first call-processing vector.

15. A telecommunications switching system comprising:

first means, responsive to receipt for processing by the switching system of a call associated with an individual vector directory number (VDN), for processing the call by executing a first call-processing vector possessed by the switching system and corresponding to the individual VDN;

second means, cooperative with the first means, for requesting another call-processing vector from a source external to the switching system when called on to do so by the first means;

wherein the first means call on the second means to request the second call-processing vector as a part of executing the first call-processing vector; and the first means are further responsive to receipt from the external source of a second call-processing vector comprising a plurality of vector commands, created by in real-time by the external source in response to the request and for processing only said call exclusive of other calls, for continuing processing of the call by executing the received second call-processing vector instead of continuing execution of the first call-processing vector, and are responsive to not receiving from the external source the second call-processing vector, for continuing processing of the call by continuing to execute the first call-processing vector.

16. An adjunct for use with a telecommunications switching system that processes a received call by executing a first call-processing vector possessed by the switching system and as a part of executing the first call-processing vector requests another call-processing vector for the call from the adjunct, and responds to not receiving the second call-processing vector by continuing to process the call by continuing to execute the first call-processing vector, comprising:

an effector responsive to receipt of the request, of creating in real-time a second call-processing vector for processing only said call exclusive of other calls; and an effector of sending the second call-processing vector to the switching system to cause the switching system to continue processing the call by executing received said second call-processing vector instead of the first call-processing vector.

17. An adjunct for use with a telecommunications switching system that processes a received call by executing a first call-processing vector possessed by the switching system and as a part of executing the first call-processing vector requests another call-processing vector for the call from the adjunct, and responds to not receiving the second call-processing vector by continuing to process the call by continuing to execute the first call-processing vector, comprising:

means responsive to receipt of the request, for creating in real-time a second call-processing vector for processing only said call exclusive of other calls; and means for sending the second call-processing vector to the switching system to cause the switching system to continue processing the call by executing received said second call-processing vector instead of the first call-processing vector.

* * * * *